United States Patent
Waller

(10) Patent No.: US 8,966,241 B2
(45) Date of Patent: Feb. 24, 2015

(54) APPARATUS AND METHOD FOR SENDING ENCRYPTED DATA TO CONDITIONAL ACCESS MODULE OVER COMMON INTERFACE, CONDITIONAL ACCESS MODULE AND SYSTEM THEREOF

(75) Inventor: Arthur Simon Waller, Staines (GB)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/459,608

(22) Filed: Apr. 30, 2012

(65) Prior Publication Data

US 2012/0278610 A1 Nov. 1, 2012

(30) Foreign Application Priority Data

Apr. 28, 2011 (GB) .................................. 1107156.0
Feb. 24, 2012 (KR) ........................ 10-2012-0018916

(51) Int. Cl.
*H04L 9/00* (2006.01)
*H04K 1/00* (2006.01)
*H04N 21/2347* (2011.01)
*H04N 21/266* (2011.01)
*H04N 21/418* (2011.01)
*H04N 21/4405* (2011.01)
*H04N 21/4623* (2011.01)
*H04N 21/436* (2011.01)

(52) U.S. Cl.
CPC ..... *H04N 21/2347* (2013.01); *H04N 21/26606* (2013.01); *H04N 21/4181* (2013.01); *H04N 21/4405* (2013.01); *H04N 21/4623* (2013.01); *H04N 21/43607* (2013.01)
USPC ............................ 713/150; 713/189; 380/210

(58) Field of Classification Search
USPC ........................................................ 713/150
See application file for complete search history.

(56) References Cited

U.S. PATENT DOCUMENTS

| | | | |
|---|---|---|---|
| 8,205,240 B2 * | 6/2012 | Ansari et al. ....................... | 726/1 |
| 2005/0177845 A1 * | 8/2005 | Patariu et al. ..................... | 725/31 |
| 2006/0184790 A1 * | 8/2006 | Oliveira et al. ............... | 713/160 |
| 2007/0133541 A1 | 6/2007 | Jung et al. | |
| 2008/0089516 A1 * | 4/2008 | Cocchi et al. ................. | 380/200 |
| 2009/0323948 A1 * | 12/2009 | Fukushima et al. .......... | 380/210 |
| 2010/0189424 A1 * | 7/2010 | Doehla et al. ................ | 386/124 |
| 2010/0269129 A1 * | 10/2010 | Lim ............................... | 725/27 |

FOREIGN PATENT DOCUMENTS

EP 2028801 A2 2/2009

OTHER PUBLICATIONS

Communication dated May 20, 2014 issued by the European Patent Office in counterpart European Patent Application No. 12165931.2.
Alexander M. et al., "CIplus-Standard und neue Anwendungsmoglichkeiten", FKT Fernseh und Kinotechnik, Fachverlag Schiele & Schon GMBH., Berlin, DE, Vol. 64, No. 8-9, Aug. 1, 2010, p. 424-429, XP001558110, ISSN 1430-9947.

* cited by examiner

*Primary Examiner* — Christopher Revak
(74) *Attorney, Agent, or Firm* — Sughrue Mion, PLLC

(57) ABSTRACT

An apparatus and method for sending encrypted data to a conditional access module (CAM) over a common interface (CI). A plurality of data packets are formed, and one data packet of the plurality of data packets includes a header and a payload for storing the encrypted data. The data packets are sent to the CAM over a transport stream (TS) interface of the CI. Encrypted data in different file formats can be sent over the TS interface. An initialization message including information about a selected format can be sent to the CAM over a control interface of the CI, and the CAM can send data request messages over the control interface to request specific data.

37 Claims, 12 Drawing Sheets

FIG. 5

| Syntax | No. of Bits | Mnemonic |
|---|---|---|
| ms_data() {  |  |  |
|    track_id | 32 | uimsbf |
|    number_of_samples | 8 | uimsbf |
|    for (i=0; i<number_of_samples; i++) { |  |  |
|      AlgorithmID | 24 | uimsbf |
|      IV_size | 8 | uimsbf |
|      KID | 16*8 | uimsbf |
|      auxiliary_sample_size | 8 | uimsbf |
|      for (i=0; i<auxiliary_sample_size; i++) { |  |  |
|         auxiliary_sample_data | 8 | uimsbf |
|      } |  |  |
|    } |  |  |
|    for (i=0; i<number_of_samples; i++) { |  |  |
|      sample_length | 32 | uimsbf |
|      for (i=0; i<sample_length; i++) { |  |  |
|         sample_data | 8 | uimsbf |
|      } |  |  |
|    } |  |  |
| } |  |  |

FIG. 6

| Syntax | No. of Bits | Mnemonic |
|---|---|---|
| message() {  |  |  |
|    command_id | 8 | uimsbf |
|    transaction_id | 32 | uimsbf |
|    payload() |  |  |
| } |  |  |

FIG. 7

| Command | command_id | Direction |
|---|---|---|
| RESERVED | 0x00 | |
| INITIALIZATION | 0x01 | D ⟶ C |
| INIT_RSP | 0x02 | C ⟶ D |
| DATA_REQ | 0x03 | C ⟶ D |
| DATA_RSP | 0x04 | D ⟶ C |
| TRACK_DEFN | 0x05 | D ⟶ C |
| TRACK_RSP | 0x06 | C ⟶ D |
| CLOSE | 0x07 | D ⟶ C |
| CLOSE_RSP | 0x08 | C ⟶ D |
| PSSH_UPDATE_REQ | 0x09 | C ⟶ D |
| PSSH_UPDATE_RSP | 0x0A | D ⟶ C |
| WRITE_REQ | 0x0B | C ⟶ D |
| WRITE_RSP | 0x0C | D ⟶ C |

FIG. 8

| Syntax | No. of Bits | Mnemonic |
|---|---|---|
| initialization() {<br>   command_id<br>   transaction_id<br>   reserved<br>   content_format<br>   ts_packet_pid<br>   pssh_count<br>   for (i=0; i<pssh_count; i++) {<br>      pssh_data()<br>   }<br>} | <br>8<br>32<br>1<br>2<br>13<br>8 | <br>uimsbf<br>uimsbf<br>bslbf<br>bslbf<br>uimsbf<br>uimsbf |

FIG. 9

| Syntax | No. of Bits | Mnemonic |
|---|---|---|
| init_ack() {<br>    command_id<br>    transaction_id<br>    status<br>} | <br>8<br>32<br>8 | <br>uimsbf<br>uimsbf<br>uimsbf |

FIG. 10

| Syntax | No. of Bits | Mnemonic |
|---|---|---|
| data_req() {<br>    command_id<br>    transaction_id<br>    data_offset<br>    data_length<br>} | <br>8<br>32<br>64<br>32 | <br>uimsbf<br>uimsbf<br>uimsbf<br>uimsbf |

FIG. 11

| Syntax | No. of Bits | Mnemonic |
|---|---|---|
| data_rsp() {<br>    command_id<br>    transaction_id<br>    status<br>    if (status == 0) {<br>      data_length<br>      for (i=0; i<data_length; i++) {<br>        data<br>      }<br>    }<br>} | <br>8<br>32<br>8<br><br>32<br><br>8 | <br>uimsbf<br>uimsbf<br>uimsbf<br><br>uimsbf<br><br>uimsbf |

FIG. 12

| Syntax | No. of Bits | Mnemonic |
|---|---|---|
| pssh_update_req() {<br>   command_id<br>   transaction_id<br>   pssh_data()<br>} | <br>8<br>32<br> | <br>uimsbf<br>uimsbf<br> |

FIG. 13

| Syntax | No. of Bits | Mnemonic |
|---|---|---|
| pssh_update_rsp() {<br>   command_id<br>   transaction_id<br>   status<br>} | <br>8<br>32<br>8 | <br>uimsbf<br>uimsbf<br>uimsbf |

FIG. 14

| Syntax | No. of Bits | Mnemonic |
|---|---|---|
| write_req() {<br>   command_id<br>   transaction_id<br>   data_offset<br>   data_length<br>   for (i=0; i<data_length; i++) {<br>      data<br>   }<br>} | <br>8<br>32<br>64<br>32<br><br>8<br><br> | <br>uimsbf<br>uimsbf<br>uimsbf<br>uimsbf<br><br>uimsbf<br><br> |

FIG. 15

| Syntax | No. of Bits | Mnemonic |
|---|---|---|
| write_rsp() {<br>    command_id<br>    transaction_id<br>    status<br>} | <br>8<br>32<br>8 | <br>uimsbf<br>uimsbf<br>uimsbf |

FIG. 16

| Syntax | No. of Bits | Mnemonic |
|---|---|---|
| track_defn() {<br>    command_id<br>    transaction_id<br>    track_ID<br>    sinf_data()<br>} | <br>8<br>32<br>32 | <br>uimsbf<br>uimsbf<br>uimsbf |

FIG. 17

| Syntax | No. of Bits | Mnemonic |
|---|---|---|
| track_ack() {<br>    command_id<br>    transaction_id<br>    status<br>} | <br>8<br>32<br>8 | <br>uimsbf<br>uimsbf<br>uimsbf |

FIG. 18

| Syntax | No. of Bits | Mnemonic |
|---|---|---|
| close() {<br>   command_id<br>   transaction_id<br>   immediate<br>   reserved<br>} | <br>8<br>32<br>1<br>7 | <br>uimsbf<br>uimsbf<br>bslbf<br>bslbf |

FIG. 19

| Syntax | No. of Bits | Mnemonic |
|---|---|---|
| close_ack() {<br>   command_id<br>   transaction_id<br>   status<br>} | <br>8<br>32<br>8 | <br>uimsbf<br>uimsbf<br>uimsbf |

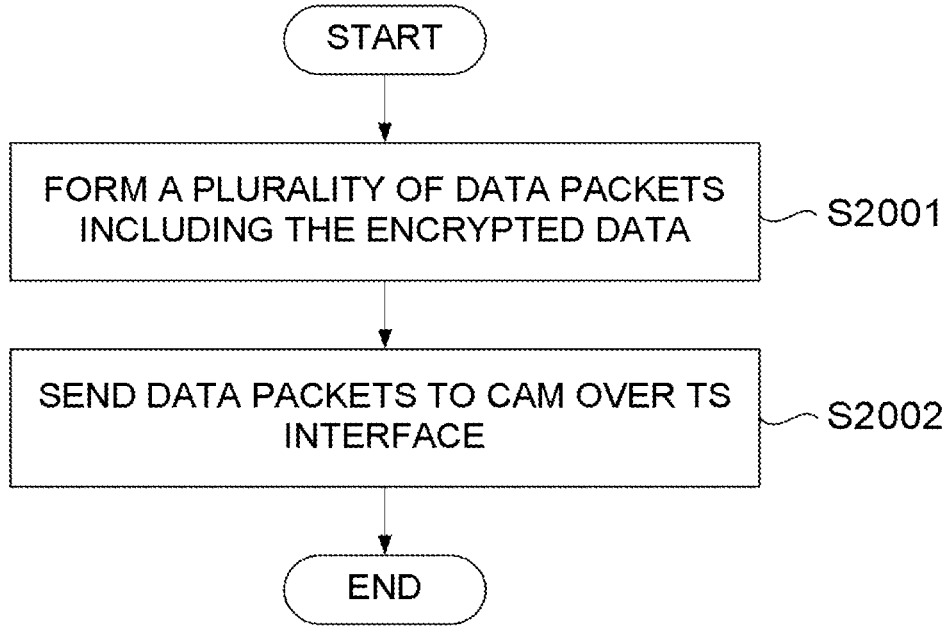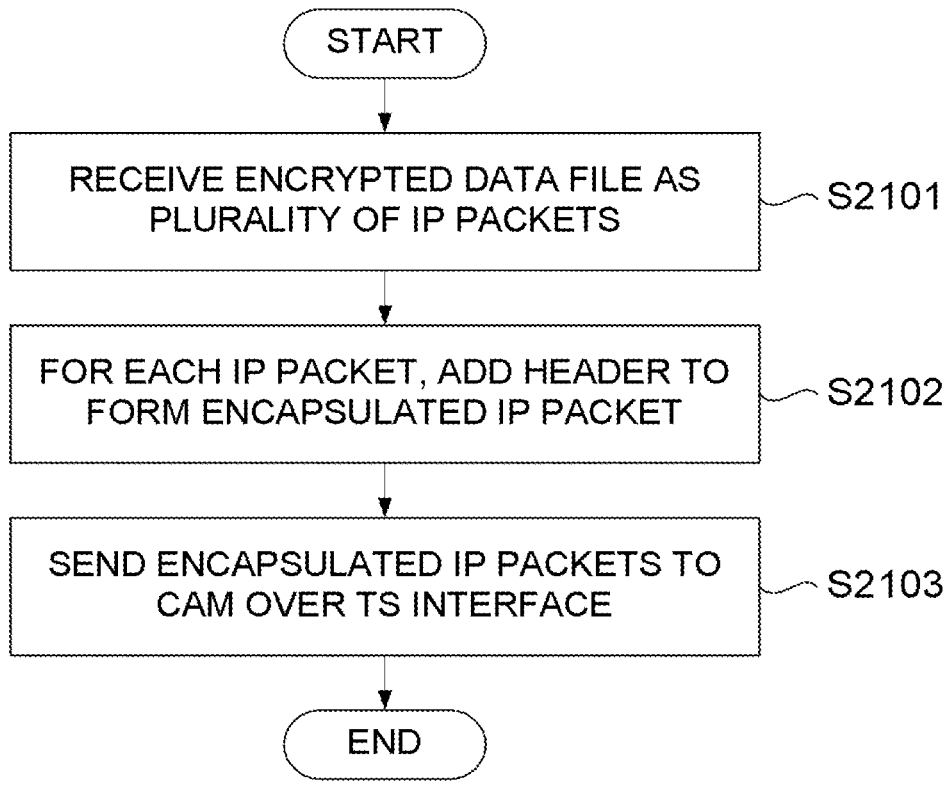

APPARATUS AND METHOD FOR SENDING ENCRYPTED DATA TO CONDITIONAL ACCESS MODULE OVER COMMON INTERFACE, CONDITIONAL ACCESS MODULE AND SYSTEM THEREOF

PRIORITY

This application claims priority under 35 U.S.C. §119 (a) from UK Patent Application No. GB1107156.0, filed on Apr. 28, 2011 in the UK Intellectual Property Office, and from Korean Patent Application No. 10-2012-0018916, filed on Feb. 24, 2012, in the Korean Intellectual Property Office, the disclosures of which are incorporated herein by reference in their entirety.

BACKGROUND

1. Field

Aspects of the exemplary embodiments relate to an apparatus and a method for sending encrypted data, and more particularly, to an apparatus and a method for sending encrypted data to a conditional access module over a common interface.

2. Related Art

Recently, various types of multimedia content is produced and provided to consumers. However, due to the development of image technologies and copy technologies, unauthorized copying of multimedia content is becoming uncontrollable and wreaking havoc on content providers.

In order to address such problems, content providers or broadcasters generally employ a conditional access system (CAS) to protect broadcast content or a digital rights management (DRM) system to protect broadband content and to protect multimedia content provided to consumer devices.

SUMMARY

Aspects of the exemplary embodiments relate to an apparatus and a method for generating a plurality of packets including a payload and a header where encrypted data is stored and sending the generated data packets to a conditional access module over a transport stream (TS) interface of common interface.

According to an aspect of another exemplary embodiment, an apparatus for sending encrypted data to a conditional access module (CAM) over a common interface (CI) includes: a data packet generator configured to form a plurality of data packets, each data packet including a header and a payload for storing the encrypted data, and a transport stream TS interface module configured to send the plurality of data packets to the CAM over a TS interface of the CI.

In exemplary embodiments where the apparatus is a decoder configured to receive and decode encrypted multimedia data, the data packet generator and TS interface module may be incorporated in a demodulator of the decoder.

The encrypted data may be received from a content provider as a plurality of internet protocol IP packets, and the data packet generator may be configured to form each data packet by attaching the header to one of the plurality of IP packets to form an encapsulated IP packet.

The TS interface module may be configured to send the encapsulated IP packets over the TS interface using multiprotocol encapsulation MPE according to the European Telecommunications Standards Institute ETSI EN 301 192 standard.

The data packet generator may be configured to parse a file containing the encrypted data to extract data samples and encryption information relating to the data samples, and the data packet generator may be further configured to generate a plurality of data sample files, each data sample file including one or more of the data samples and the encryption information relating to the one or more data samples.

For each data packet, the data packet generator may be configured to include one of the data sample files in the payload of said data packet.

The data packet generator may be further configured to divide the data sample file into a plurality of data sample file portions, and the plurality of data packets may be Moving Picture Experts Group MPEG-2 TS packets, each MPEG-2 TS packet including one of the data sample file portions.

The header of each TS packet may include information about whether the data sample file portion included in that TS packet corresponds to a start of the data sample file.

The apparatus may be configured to receive the encrypted data by downloading the encrypted data to a storage device, or receiving the encrypted data as a progressive download from a server, or receiving the encrypted data as a plurality of files using adaptive streaming, or receiving the encrypted data as a continuous stream using content streaming.

The encrypted data may be stored in a local storage device of the apparatus.

The encrypted data may be in an International Organization for Standardization base media file format ISOBMFF file.

The apparatus may be configured to receive decrypted data from the CAM over the TS interface, and decode the decrypted data.

The apparatus may be configured to send an initialization message to the CAM over a control interface of the CI, to notify the CAM that the encrypted data will be sent over the TS interface.

The data packet generator may be configured to form the plurality of data packets according to a selected one of a plurality of formats, and the apparatus may be configured to include information about the selected format in the initialization message sent to the CAM.

The apparatus may be configured to include packet identifier PID information in the initialization message sent to the CAM.

The apparatus may be configured to send a close message to the CAM over the control interface once all of the encrypted data has been sent.

The apparatus may be configured to receive a data request message from the CAM over the control interface, retrieve requested data specified in the data request message, and send the requested data to the CAM.

The apparatus may be configured to receive a data write request message from the CAM over the control interface, the data write request message including data to be written and data location information, and may be configured to write the data included in the data write request message to a file, according to the data location information.

The apparatus may be configured to send a track definition message to the CAM over the control interface, the track definition message including information about a track and digital rights management DRM information relating to the track.

According to an aspect of another exemplary embodiment, a conditional access module CAM for receiving encrypted data over a common interface CI, the CAM includes: a control module configured to receive an initialization message over a control interface of the CI, the initialization message including format information about a format in which the encrypted data will be received over a TS interface of the CI, a conditional access CA decryption module configured to receive the encrypted data over the TS interface, and decrypt the encrypted data based on the format information of the initialization message, and a data transmitter configured to send the decrypted data over the TS interface to a source from which the encrypted data was received.

If the decryption module requires additional data to decrypt the encrypted data, the control module may be configured to send a data request message over the control interface to request the additional data.

The CAM may be configured to send a data write request message over the control interface to request data to be written to a file, the data write request message including data to be written to the file and data location information, the data location information relating to a location in the file at which the data is to be written.

The CAM may be configured to receive a track definition message over the control interface, the track definition message including information about a track and digital rights management DRM information relating to the track, and may be configured to set up a DRM system for the track based on the DRM information included in the track definition message.

The CAM may be configured according to the CI Plus specification, and the data transmitter may comprise a content control CC encryption module configured to send the decrypted data using local encryption.

According to an aspect of another exemplary embodiment, there is further provided a system for decrypting encrypted data, the system comprising the apparatus and the CAM coupled to the apparatus by the CI.

According to an exemplary embodiment, a method of sending encrypted data to a conditional access module CAM over a common interface CI includes: forming a plurality of data packets, each data packet including a header and a payload for storing the encrypted data, and sending the plurality of data packets to the CAM over a TS interface of the CI.

The method may further comprise receiving the encrypted data from a content provider as a plurality of internet protocol IP packets, wherein each data packet may be formed by attaching the header to one of the plurality of IP packets to form an encapsulated IP packet.

Sending the plurality of data packets may comprise sending the encapsulated IP packets over the TS interface using multiprotocol encapsulation MPE according to the European Telecommunications Standards Institute ETSI EN 301 192 standard.

The method may further comprise parsing a file containing the encrypted data to extract data samples and encryption information relating to the data samples, and generating a plurality of data sample files, each data sample file including one or more of the data samples and the encryption information relating to the one or more data samples.

Forming each data packet may comprise including one of the data sample files in the payload of said data packet.

The method may further comprise dividing the data sample file into a plurality of data sample file portions, wherein the plurality of data packets may be Moving Picture Experts Group MPEG-2 TS packets, each MPEG-2 TS packet including one of the data sample file portions.

The encrypted data may be in an International Organization for Standardization base media file format ISOBMFF file.

The method may further comprise sending an initialization message to the CAM over a control interface of the CI, to notify the CAM that the encrypted data will be sent over the TS interface.

The method may further comprise selecting one of a plurality of formats for sending the encrypted data to the CAM, and including information about the selected format in the initialization message sent to the CAM.

The method may further comprise sending a close message to the CAM over the control interface once all of the encrypted data has been sent.

The method may further comprise receiving a data request message from the CAM over the control interface, retrieving requested data specified in the data request message, and sending the requested data to the CAM.

The method may further comprise receiving a data write request message from the CAM over the control interface, the data write request message including data to be written and data location information, and writing the data included in the data write request message to a file, according to the data location information.

The method may further comprise sending a track definition message to the CAM over the control interface, the track definition message including information about a track and digital rights management DRM information relating to the track.

According to an aspect of another exemplary embodiment, there is further provided a computer readable storage medium storing a computer program which, when executed on a processor, causes the processor to perform the method.

BRIEF DESCRIPTION OF THE DRAWINGS

FIG. 5 illustrates the syntax of the ms_data structure shown in FIGS. 3 and 4;

FIG. 6 illustrates the syntax of a command message, according to an aspect of an exemplary embodiment;

FIG. 7 illustrates values of the command_id field for different types of command messages;

FIG. 8 illustrates the syntax of an initialization message, according to an aspect of an exemplary embodiment;

FIG. 9 illustrates the syntax of an init_ack message sent from a CAM in response to the initialization message of FIG. 8;

FIG. 10 illustrates the syntax of a data request message sent from a CAM, according to an aspect of an exemplary embodiment;

FIG. 11 illustrates the syntax of a data response message sent in response to the data request message of FIG. 10;

FIG. 12 illustrates the syntax of a pssh update request message sent from a CAM, according to an aspect of an exemplary embodiment;

FIG. 13 illustrates the syntax of a pssh update response message sent in response to the pssh update request message of FIG. 12;

FIG. 14 illustrates the syntax of a data write request message according to an aspect of an exemplary embodiment FIG. 15 illustrates the syntax of a data write response message sent in response to the data write request message of FIG. 14;

FIG. 16 illustrates the syntax of a track definition message according to an aspect of an exemplary embodiment;

FIG. 17 illustrates the syntax of a track_ack message sent from a CAM in response to the track definition message of FIG. 16;

FIG. 18 illustrates the syntax of a close message, according to an aspect of an exemplary embodiment;

FIG. 19 illustrates the syntax of a close_ack message sent from a CAM in response to the close message of FIG. 18;

FIG. 20 illustrates a method of sending encrypted data to a CAM over a TS interface, according to an aspect of an exemplary embodiment;

FIG. 21 illustrates a method of forming a plurality of encapsulated IP packets, according to an aspect of an exemplary embodiment;

DETAILED DESCRIPTION OF EXEMPLARY EMBODIMENTS

Figure 1A:
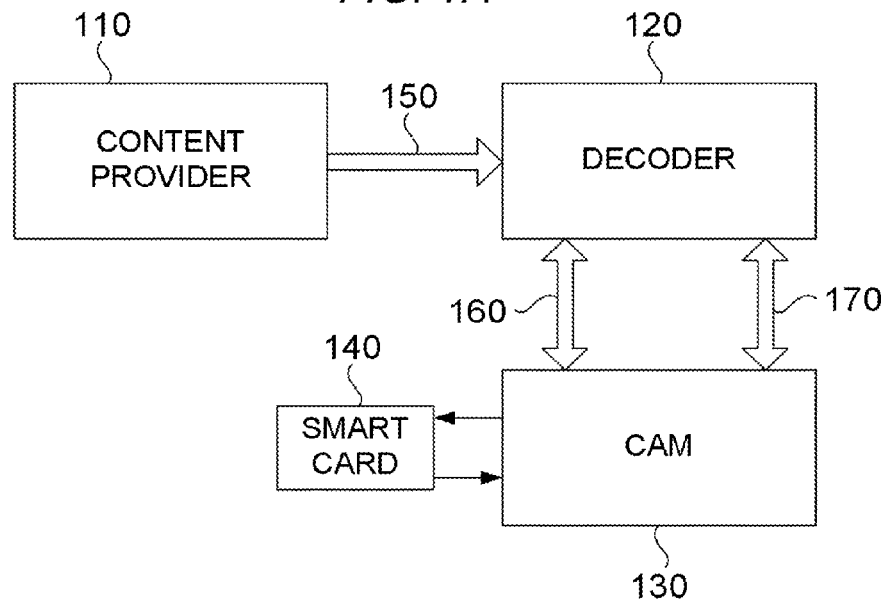
FIGS. 1A, 1B and 1C are block diagrams schematically illustrating a system for decrypting multimedia data, according to an exemplary embodiment.

Referring now to FIG. 1A, a system for decrypting encrypted multimedia data is schematically illustrated, according to an exemplary embodiment. The system comprises a content provider 110, for example a server, a decoder 120 for decoding and reproducing multimedia data received from the content provider 110, a CAM 130 and a smart card 140. The decoder 120 receives multimedia data from the content provider 110 over a broadband connection 150, and is coupled to the CAM 130 by a CI. The CI is configured according to the EN50221 standard, and comprises a bidirectional TS interface 160 and a control interface 170. The TS interface 160 may be a high speed interface capable of running at up to 100 Mb/s in each direction, which was originally defined in EN50221 and then extended by the CI Plus specification. The decoder 120 is arranged to send encrypted data to the CAM 130 over the TS interface 160, and receive decrypted data from the CAM 130 over the TS interface 160. The control interface 170 is used to transfer control signals between the decoder 120 and the CAM 130, for example to notify the CAM 130 that encrypted data is about to be sent over the TS interface 160.

The decoder 120 includes a tuner for receiving the encrypted multimedia data from the content provider 110. However, the encrypted multimedia data may not be received from a remote source, but may instead be locally stored, for example in an internal hard disk of the decoder 120 or on a memory device coupled to the decoder 120, such as a USB memory stick. The encrypted multimedia data may be received in an International Organization for Standardization Base Media File Format ISOBMFF, as specified in standard ISO/IEC 14496-12. However, other formats may be used, for example an MP4FF file format as defined in ISO/IEC 14496-14. In general, a decoder according to an exemplary embodiment may be configured to receive encrypted multimedia data in a file format other than an MPEG-2 TS format.

There are different methods by which multimedia content may be received over broadband. For example, in a content download method, content is downloaded to a local storage device. Once the download is complete, the content may then be played using the CAM to decrypt it. In a progressive download method, content is requested to be played immediately from a server. The content is received as a single file which is retrieved using a hyper-text transfer protocol (HTTP) GET command. In an adaptive streaming method, content is requested to be played immediately, and is received as a plurality of files which are retrieved using sequential HTTP GET commands. In a content streaming method, content is received as a continuous stream delivered using real-time transport protocol (RTP). In all of the above methods, a user may use trick modes such as fast-forward or rewind while the content is being reproduced. Exemplary embodiments may be configured for use with one or more of these content delivery methods, or may use a different method.

Figure 1B:
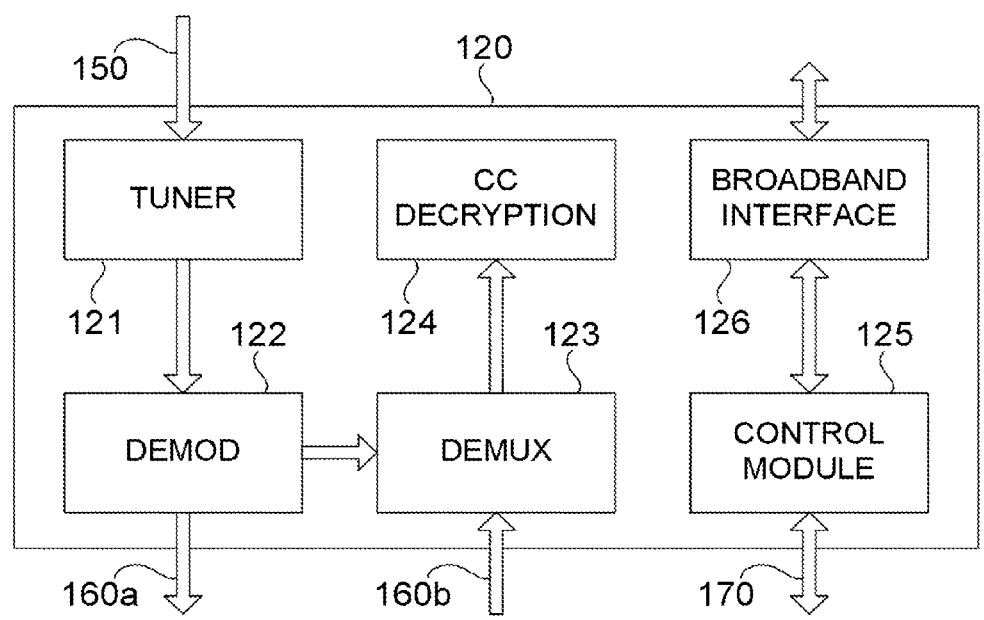
Figure 1C:
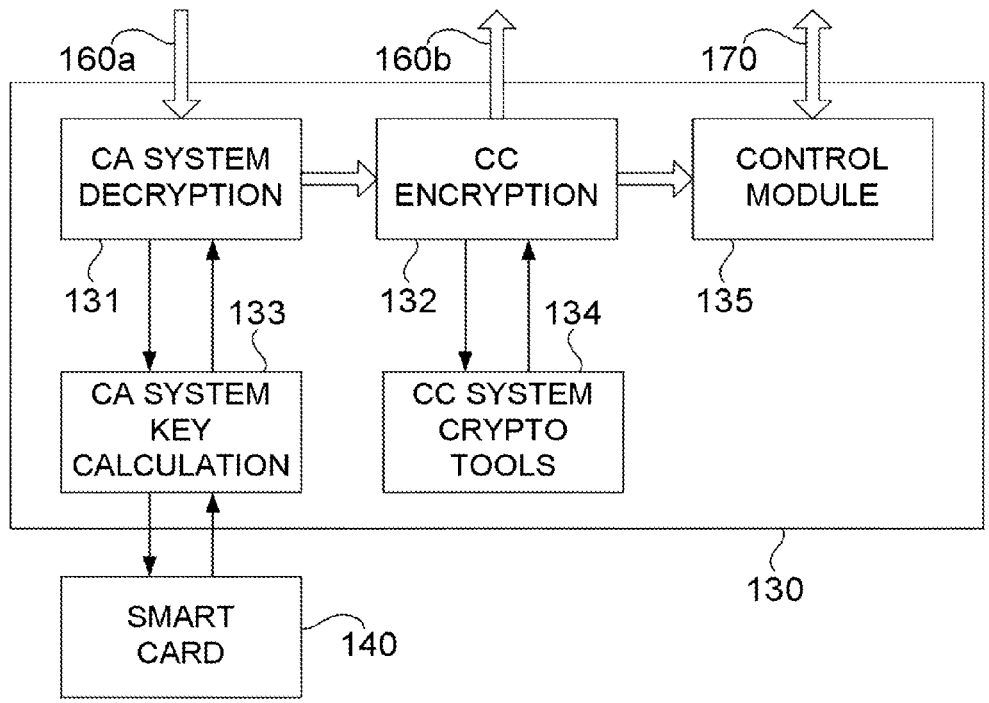

The operation of the decoder 120 and CAM 130 will now be described with reference to FIGS. 1B and 1C, which are block diagrams schematically illustrating a structure of the decoder 120 and CAM 130, respectively. As shown in FIG. 1B, the decoder 120 includes a tuner 121, a demodulator (demod) 122, a demultiplexer (demux) 123, a content control (CC) decryption module 124, a control module 125 and a broadband interface 126. As shown in FIG. 1C, the CAM 130 includes a conditional access (CA) system decryption module 131, a CC encryption module 132, a CA system key calculation module 133, a CC system crypto tools module 134 and a control module 135.

According to an exemplary embodiment, the decoder and CAM are configured according to the CI Plus specification, which defines the content control (CC) feature. Content control encrypts the decrypted data before it is sent back to the decoder, which then decrypts the data. This can be referred to as local encryption, and prevents the unauthorized copying of unencrypted data between the CAM and decoder. In an exemplary embodiment that is not configured to be CI Plus compatible, the CC components of the decoder and CAM may be omitted, namely the CC decryption module 124, CC encryption module 132 and CC system crypto tools module 134.

The tuner 121 of the decoder 120 receives a signal from the content provider 110 and tunes to a particular channel. The signal on the tuned channel is sent to the demodulator 122, which converts the signal to a binary format. In this way, the demodulator 122 can obtain the encrypted data from the signal received by the tuner 121. The decoder 120 is configured to convert the encrypted data from a first file format, which is a file format other than an MPEG-2 TS format, to a second file format to be transmitted to the CAM 130 over the TS interface 160. In converting the encrypted data to the second file format, the decoder 120 may form a plurality of data packets to be sent over the TS interface 160, each data packet including the encrypted data to be decrypted by the CAM 130. Therefore even when the encrypted data is not received as a plurality of MPEG-2 TS packets, the encrypted data can still be sent over the TS interface.

In this way, encrypted multimedia content can be received in different file formats other than the conventional MPEG-2 TS format. An exemplary embodiment therefore allows a DRM to be embedded in a CAM such that it appears to the user to behave in the same way as a DRM embedded in the device itself. That is, the user can access content protected by a DRM in a seamless manner regardless of whether the content is received as an MPEG-2 TS, an ISOBMFF file, or in any other file format. According to an exemplary embodiment, the multimedia content is received as an ISOBMFF file, but alternative formats may be used in other exemplary embodiments. The second file format may be a TS format, or may be a different format. Examples of suitable formats will be described later.

As shown in FIGS. 1B and 1C, the TS interface 160 is a bidirectional interface comprising a first link 160a for carrying encrypted data from the decoder 120 to the CAM 130 and a second link 160b for carrying decrypted data from the CAM 130 to the decoder 120. If the demodulator 122 extracts unencrypted data from the signal received from the tuner 121, the demodulator 122 can send the data directly to the demultiplexer 123 and bypass the CAM 130.

The CA system decryption module 131 of the CAM 130 receives the encrypted data from the decoder 120 over the first link 160a of the TS interface 160, and decrypts the data using a CA decryption cipher. The CA system key calculation module 133 performs authentication using the smart card 140, to prevent an unauthorized user from decrypting and viewing the protected multimedia content. The decrypted data is sent to the CC encryption module 132 which returns the decrypted data to the decoder 120 via the second link 160b of the TS interface. The decrypted data may be sent to the decoder 120 in the same format in which the encrypted data was sent to the CAM 130, i.e. in the second file format, or may be sent using a different file format, i.e. a third file format.

The demultiplexer 123 receives the decrypted multimedia data from the CC encryption module 132 of the CAM 130, and extracts audio, video and/or other data from the decrypted data. The audio/video or other data is sent to the CC decryption module 124 to be decoded and presented to a user. The decoded audio/video data does not have to be immediately reproduced, but could for example be stored in a local storage unit, such as a hard disk, and subsequently reproduced at a later stage.

The decoder 120 and CAM 130 further comprise control modules 125, 135 for sending control messages between the decoder 120 and the CAM 130 over the control interface 170. For example, the control module 125 of the decoder 120 may send a control message to the control module 135 of the CAM 130, to inform the CAM 130 that encrypted data is about to be sent over the TS interface 160 in a specified file format. The control modules 125, 135 may also use a broadband interface 126 of the decoder 120 to communicate with external devices. For example, the DRM in the CAM may need to communicate with a remote server on the internet to check that a user has the appropriate rights to play particular content. This can be done using the low speed communications (LSC) resource that is specified by CI Plus, which allows the CAM to send and receive IP packets over the broadband interface in the decoder. The broadband interface 126 may use the same physical connection on which the multimedia content is received from the content provider 110, or may use a separate physical connection.

The structures shown in FIGS. 1A, 1B and 1C are illustrative only and the exemplary embodiments are not limited to these arrangements. Components illustrated in FIGS. 1B and 1C are not necessarily physically distinct components, but may for example be implemented as software modules executed on a processor, and the functionality of one or more components may be combined into a single module or divided amongst several modules.

Figure 2:
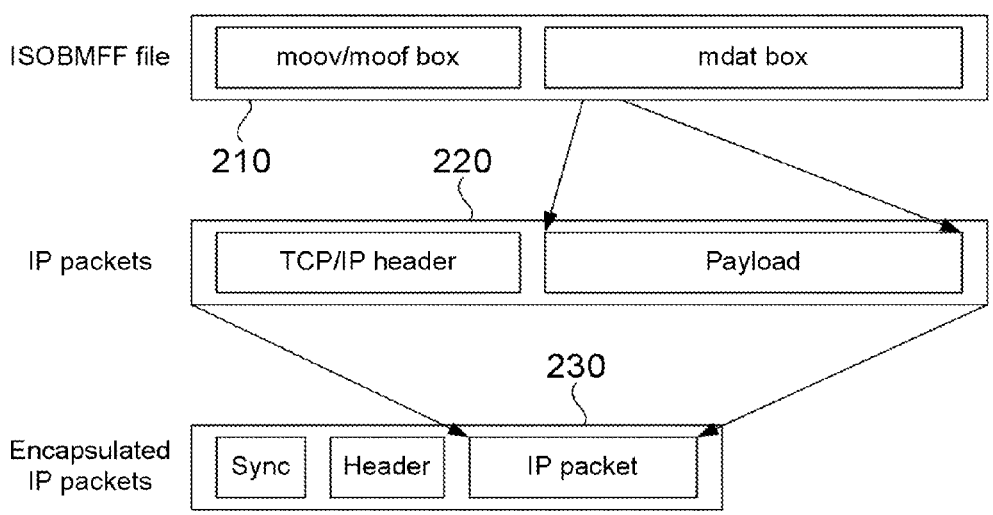
FIG. 2 illustrates a data packet structure for sending received IP packets to a CAM over a TS interface, according to an aspect of an exemplary embodiment.
Figure 3:
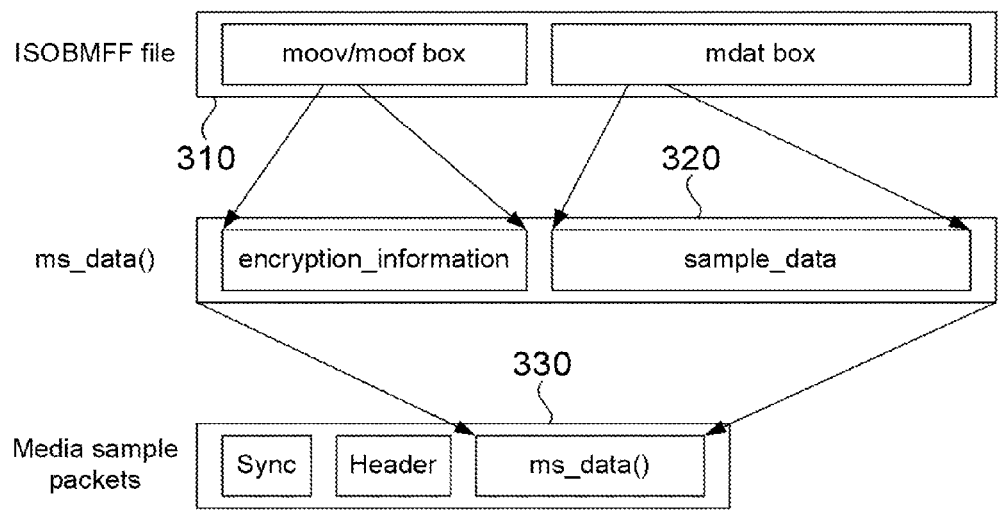
FIG. 3 illustrates a data packet structure for sending data samples from a received ISOBMFF file to a CAM over a TS interface, according to an aspect of another exemplary embodiment.
Figure 4:
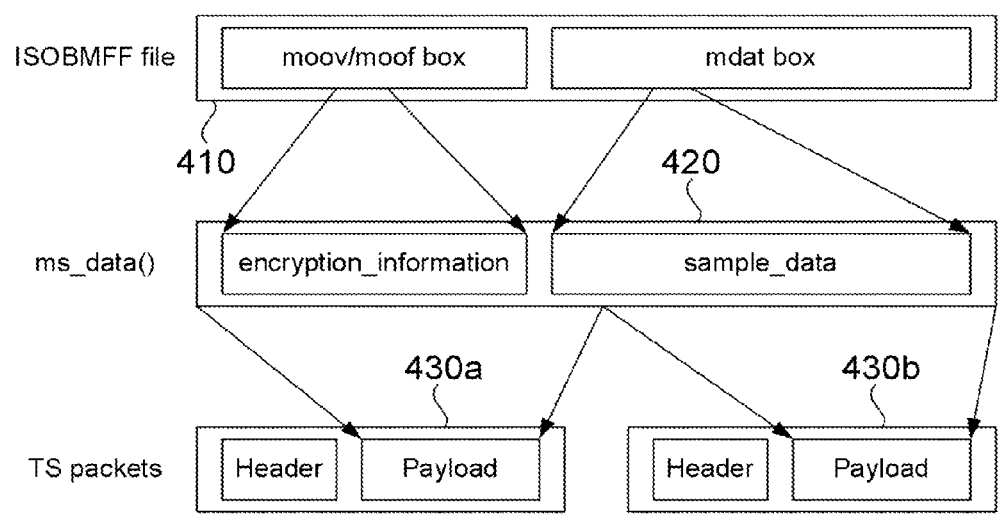
FIG. 4 illustrates a TS data packet structure for sending data samples from a received ISOBMFF file to a CAM over a TS interface, according to an aspect of another exemplary embodiment.

Examples of data packet structures suitable for sending encrypted data over the TS interface will now be described with reference to FIGS. 2, 3 and 4. A decoder may form the data packets without first parsing the received data file, in which case it is not necessary for the decoder to understand the file format in which the data is received. An exemplary embodiment in which the decoder does not parse the received data file is shown in FIG. 2. Alternatively, a decoder may parse the received data file to extract encrypted data samples to be sent to the CAM to be decrypted. In this case, the multimedia content should be received in a file format that can be understood by the decoder. Exemplary embodiments in which a received data file is parsed by the decoder are shown in FIGS. 3 and 4.

Referring now to FIG. 2, a data packet structure for sending received IP packets to a CAM over a TS interface is illustrated, according to an exemplary embodiment. In the present exemplary embodiment, multimedia content exists on a server as an ISOBMFF file 210. According to the ISOBMFF specification, data in the file is contained in a plurality of boxes. In the example shown in FIG. 2, the ISOBMFF file 210 includes a moov/moof box, which contains an index of frames, and an mdat box which contains the movie data. Other types of boxes are also defined in the ISOBMFF specification, and the exemplary embodiments are not limited to the particular ISOBMFF file structure shown in FIG. 2.

The server forms a plurality of IP packets 220, each of which includes a TCP/IP header and a portion of the ISOBMFF file 210, and sends the IP packets 220 to the decoder. For example, the decoder may receive the IP packets using HTTP over a TCP/IP connection. In the present exemplary embodiment, when the decoder receives the IP packets 220, the decoder does not extract the ISOBMFF data from the packets to reconstruct and parse the ISOBMFF file. Instead, for each received IP packet that includes data from the ISOBMFF file, the decoder forms an encapsulated IP packet 230 which includes the received IP packet, a sync byte, and a header byte. In the present exemplary embodiment, the sync byte is set to have a value of 0xB8, but in other exemplary embodiments other values may be used. The header byte includes two transport scrambling control bits and six reserved bits. In encapsulated IP packets sent to the CAM, the two transport scrambling control bits are set to 00 (no scrambling). In encapsulated IP packets received from the CAM, the transport scrambling control bits may be set to 00, 01 or 10, as defined by the CI Plus specification. The encapsulated IP packet 230 is sent to the CAM over the TS interface. Received IP packets that do not include data from the ISOBMFF file do not need to be sent to the CAM.

Although in the present exemplary embodiment the IP packets 220 are received from a server, in another exemplary embodiment the multimedia data may be stored locally, for example on an internal hard disk of the decoder or a USB memory stick connected to the decoder. In such an exemplary embodiment, the decoder may package the stored multimedia data file into a plurality of IP packets, and then encapsulate the IP packets for transmission over the TS interface.

In the present exemplary embodiment, the data passing over the TS interface is not a transport stream. However, the electrical timings for all signals on the TS interface can be maintained as set out in the EN50221 standard, except that MCLKI and MCLKO may be discontinuous and may comprise many short bursts of data. The signals are defined as follows:

MCLKI: The byte clock from the decoder to the CAM. The rising edge is used to clock into the CAM the values of the MDI, MISTRT and MIVAL signals.

MISTRT: Valid for the packet sync byte from the decoder to the CAM.

MIVAL: Indicates valid data bytes on MDI0-7.

MDI0-7: Data bus for data from the decoder to the CAM.

MCLKO: The byte clock from the CAM to the decoder. The rising edge is used to clock into the decoder the values of the MDO, MOSTRT and MOVAL signals.

MOSTRT: Valid for the packet sync byte from the CAM to the decoder.

MOVAL: Indicates valid data bytes on MDO0-7.

MDO0-7: Data bus for data from the CAM to the decoder.

In the present exemplary embodiment, the IP packets are sent over the TS interface as encapsulated IP packets. However, in another exemplary embodiment the decoder may be configured to send the IP packets over the TS interface using Multiprotocol Encapsulation (MPE) as defined in ETSI EN 301 192. In this case, the decoder is configured to not use payload or address scrambling, and the CAM is configured to ignore the media access control (MAC) address fields, and any program map table (PMT). The Packet Identifier (PID) signaled in the initialization( ) Application Protocol Data Unit (APDU), described later with reference to FIG. 8, is used for all packets containing MPE data.

In the exemplary embodiment of FIG. 2, the decoder does not parse the received file, and so it is not necessary for the decoder to be able to understand the file format in which the multimedia data is received. However, in other exemplary embodiments, the decoder may parse the received file to extract encrypted data to be sent to the CAM. For example, when the encrypted data is received as an ISOBMFF file, media sample data and encryption metadata associated with the media samples can be extracted from the file and passed to the CAM over the TS interface. Data packet structures suitable for use in this case are shown in FIGS. 3 and 4. Preferably, when the decoder is required to parse the ISOBMFF file to extract encryption metadata, the file should be compliant with the Common Encryption scheme defined in the draft amendment to ISO/IEC 14496-12.

Referring now to FIG. 3, a data packet structure for sending data samples from a received ISOBMFF file to a CAM over a TS interface is illustrated, according to an aspect of another exemplary embodiment. In this exemplary embodiment, a decoder receives an ISOBMFF file 310 and parses the file to extract data samples from the mdat box, and encryption metadata associated with the data samples from the moov/moof box. The data samples and encryption metadata are encapsulated in an ms_data( ) structure 320, which is described in more detail later. Each ms_data( ) structure 320 can contain one data sample from the ISOBMFF file, or a plurality of data samples. Here, data sample refers to a portion of data extracted from the ISOBMFF file 310, for example media data extracted from the mdat box. The decoder is configured to send a stream of ms_data( ) structures 320 sequentially to the CAM over the TS interface until all data samples of the ISOBMFF file have been decrypted.

Although metadata and control information relating to specific media samples are sent with those media samples over the TS interface, this need not be the case for data that does not change throughout the file. For example, metadata and control information that does not change throughout the file may be sent over the control interface to the CAM, instead of over the TS interface.

In the present exemplary embodiment, each ms_data( ) structure 320 is encapsulated in a media sample packet 330 to be sent over the TS interface. The decoder forms a media sample packet by adding a sync byte and header byte to the ms_data( ) structure 320. In the present exemplary embodiment the sync byte has a value of 0xB8, but in other exemplary embodiments other values may be used. The header byte includes two transport scrambling control bits, and six reserved bits set to 1. In media sample packets sent from the decoder to the CAM, the transport scrambling control bits are set to 00 (no scrambling). In media sample packets sent from the CAM to the decoder, the transport scrambling control bits are set to 00, 01 or 10, as defined by the CI Plus specification.

In the present exemplary embodiment, the ms_data( ) structure 320 is sent over the TS interface without any TS packet encapsulation. Therefore, the data passing over the TS interface is not a transport stream. However, as in the exemplary embodiment of FIG. 2, the electrical timings for all signals on the TS interface can be maintained as set out in the EN50221 standard, except that MCLKI and MCLKO may be discontinuous and comprise many short bursts of data. The signals are defined as follows:

MCLKI: The byte clock from the decoder to the CAM. The rising edge is used to clock into the CAM the values of the MDI, MISTRT and MIVAL signals.

MISTRT: Valid for the media sample packet sync byte from the decoder to the CAM.

MIVAL: Indicates valid data bytes on MDI0-7.

MDI0-7: The data bus for data from the decoder to the CAM.

MCLKO: The byte clock from the CAM to the decoder. The rising edge is used to clock into the decoder the values of the MDO, MOSTRT and MOVAL signals.

MOSTRT: Valid for the media sample packet sync byte from the CAM to the decoder.

MOVAL: Indicates valid data bytes on MDO0-7.

MDO0-7: The data bus for data from the CAM to the decoder.

Referring now to FIG. 4, a TS data packet structure for sending data samples from a received ISOBMFF file to a CAM over a TS interface is illustrated, according to an exemplary embodiment. In this exemplary embodiment, a decoder parses an ISOBMFF file 410 to extract data samples from the mdat box and encryption metadata, and includes the extracted data in an ms_data( ) structure 420 in a similar manner to that described above with reference to FIG. 3. However, the ms_data( ) structure 420 is then inserted into an MPEG-2 TS for transmission over the TS interface. Specifically, data from the ms_data( ) structure 420 is inserted into a plurality of TS packets 430a, 430b for transmission to a CAM, each TS packet 430a, 430b including a TS header and a payload field containing the ms_data( ) data. The ms_data( ) structure is inserted into the TS using a Data Pipe as defined in ETSI EN 301 192. In this case, an ms_data( ) structure always starts at the beginning of a TS packet.

In the present exemplary embodiment, the CAM receives the plurality of TS packets 430a, 430b, reconstructs the ms_data( ) structure 420, and decrypts the data sample or samples contained within the sample_data field. The CAM is configured to return a TS containing the decrypted sample_data from the ms_data( ) structure 420. If the decoder is CI Plus compatible, the TS packets returned from the CAM may be locally encrypted. However, in other exemplary embodiments the CAM may return the decrypted data using a different data format.

The decoder may be configured to send control messages to the CAM over the control interface, to notify the CAM of the existence of the data pipe and its associated parameters. Therefore no program association table (PAT) or program map table (PMT) is required, and the CAM can be configured to ignore these tables if present.

In the TS of FIG. 4, the transport packet header is formatted as defined in the MPEG-2 specification. In the present exemplary embodiment, the transport packet header bits are set as follows. The packet ID (PID) of the data packets is set to the value indicated by the initialisation( ) APDU. For null packets, the PID is set to 0x1fff. The sync_byte is set to 0x47. The transport_scrambling_control bits are set to 00 (no scrambling) for a TS sent from the decoder to the CAM, and set to 00, 01 or 10 (as defined by CI Plus) in a TS sent from the CAM to the decoder. The adaptation_field_control bits are set to 01 (no adaptation field, payload only). The continuity_counter bits are used as specified in ISO/IEC 13818-1. The payload_unit_start_indicator is set to 1 for a TS packet which contains the start of an ms_data( ) structure. The transport_error_indicator and transport_priority bits are all set to 0. Null packets may be inserted between packets carrying data if required.

The continuity_counter bits of the TS packet header can be used by the decoder as a flow control system. A TS packet with a particular counter value is not sent to the CAM until the previous TS packet with that counter value has been received from the CAM. Null packets are ignored for this purpose.

Referring now to FIG. 5, the syntax of the ms_data( ) structure of FIGS. 3 and 4 is illustrated. In FIG. 5, the mnemonic "uimsbf" denotes an unsigned integer, most significant bit first. To generate the ms_data( ) the decoder parses the ISOBMFF file and extracts the required data.

For each track in the ISOBMFF file, the decoder can be configured to send set up information to the CAM over the control interface so that the CAM is made aware of all tracks that need to be decrypted. Each track in the ISOBMFF file has a track number associated with it, stored as the track_ID value in the 'tkhd' box for that track. The decoder extracts data samples from the mdat boxes for each track along with the associated sample encryption information, as identified by the saio and saiz boxes. Here, data sample may refer to a single byte of data extracted from the mdat box or another box, and a single ms_data( ) message may contain a plurality of data samples, i.e. may contain a plurality of bytes. One or more media samples for a track are sent to the CAM using the ms_data( ) structure defined in FIG. 5.

In the ms_data( ) structure, the track_ID field is a 32-bit field for storing the track number for the media samples contained in the particular ms_data( ) message. Number_of_samples is an 8-bit field for storing the number of media samples included in the particular ms_data( ) message. AlgorithmID is a 24-bit field for storing the encryption algorithm used for the media sample, as extracted from the 'tenc' or 'sgpd' box of the ISOBMFF file. IV_size is an 8-bit field for storing the size of the IV for the media sample, as extracted from the 'tenc' or 'sgpd' box. KID is a field of size 16×8 bits, for storing the key ID for the media sample as extracted from the 'tenc' or 'sgpd' box. Auxiliary_sample_size is an 8-bit field for storing the amount of auxiliary data for the media sample, as indicated in the saiz box. Auxiliary_sample_data is an 8-bit field for storing the auxiliary data for the media sample, as referenced by the saio box. Sample_length is a 32-bit field for storing the number of bytes in the media sample. Sample_data is an 8-bit field for storing the data byte for the sample extracted from the mdat box.

In order to coordinate the transfer of encrypted and decrypted data between the decoder and the CAM, the decoder and CAM are configured to send control messages to each other over the control interface of the CI. For instance, the CAM may require certain information from the metadata in the ISOBMFF file to correctly decrypt the encrypted multimedia data. Examples of control messages will now be described with reference to FIGS. 6 to 19.

Referring now to FIG. 6, the syntax of a command message is illustrated according to an exemplary embodiment. The message structure shown in FIG. 6 is a generalized structure which can be applied to any message sent over the control interface.

The command messages can be sent using a Specific Application Support (SAS) resource, as defined by the CableCard Interface Specification and CI Plus. For example, in one exemplary embodiment, when a decoder needs to have an ISOBMFF file decrypted by a CAM, the decoder can be configured to open a session on the SAS resource with a private_host_application_ID of value 0xzzzzzz. Once decryption of the file has been completed the CAM sends a close_ack( ) APDU to the decoder. The decoder is configured to close the session once the close_ack( ) message is received from the CAM. However, the decoder can also be configured to keep the session open if there is another ISOBMFF file waiting to be decrypted. If the session is closed prematurely for any reason, the device and the CAM can be configured to stop sending any data over the TS interface relating to the ISOBMFF file.

The command messages can be sent over the control interface between the device and the CAM using SAS_async_msg( ) application protocol data units (APDUs). The general format of the messages passed in the message_byte field of the APDU is shown in FIG. 6, and comprises a command_id, transaction_id and payload( ). Command_id is an 8-bit field that indicates the particular type of message being sent. Transaction_id holds a unique 32-bit value that is generated by a device sending a data request message. The transaction_id value is returned in any corresponding reply message, for example a response or acknowledgment. The transaction_id allows any asynchronous request for information to be paired with any reply that returns information. There are no constraints on the value of this field. The payload( ) contains the payload of the message, if any.

In some exemplary embodiments, a CAM may be configured to send a message to the decoder, or other device, in the event that an error is encountered by the DRM in the CAM. For example, the CAM can be configured to send the OIPF rights_info or parental_control_info messages defined in OIPF Specification Volume 7, or use the CI+ browser defined in the CI Plus specification.

Referring now to FIG. 7, values of the command_id field for different types of command message are illustrated. In FIG. 7, the Direction column denotes a direction in which the particular message is sent, with D denoting the decoder and C denoting the CAM. The different message types will now be described in more detail with reference to FIGS. 8 to 19. In FIGS. 8 to 19, the command_id and transaction_id fields will not be discussed further as these fields are part of the general message format and are common to all of the message types.

Referring now to FIG. 8, the syntax of an initialization message is illustrated according to an exemplary embodiment. A decoder may send this message to a CAM to indicate that the decoder is about to start sending data from an ISOBMFF file. In the present exemplary embodiment, the initialization message is used to provide the CAM with the packet identifier (PID) that the device will use to send the file. Before sending the decrypted media data to the CAM, the decoder will also stop sending any other data over the TS interface. The CAM can be configured to flush any content data that it may be holding in its internal buffers and prepare to receive the ISOBMFF file data, when it receives an initialization message from the decoder.

In exemplary embodiments in which the decoder is configured to parse an ISOBMFF file before sending data to the CAM, the initialization( ) APDU may include the content of all of the pssh boxes found in the moov box. Sending the pssh data allows the CAM to verify the license in the pssh data to verify a user's access rights to the multimedia content contained in the ISOBMFF file. In exemplary embodiments where the decoder does not parse the ISOBMFF file, for example when the ISOBMFF file is being sent as IP packets to the CAM, the content of pssh boxes are omitted as the decoder has not parsed the file.

As shown in FIG. 8, the specific payload of an initialization message comprises a content_format, ts_packet_pid and pssh_count. Content_format is a 2-bit field which indicates the format in which the data will be sent over the TS interface. A value of 00 is used to indicate that the content will be sent using media sample packets as shown in FIG. 3. A value of 01 is used to indicate that the content will be sent using the ms_data( ) structure encapsulated in a TS, as shown in FIG. 4. A value of 10 is used to indicate that the content will be sent as encapsulated IP packets, as shown in FIG. 2. A value of 11 is used to indicate that the content will be sent as IP packets using MPE. The initialization message may therefore be used to notify the CAM of a change from the conventional MPEG-2 TS to an alternative file format.

In the present exemplary embodiment, the decoder can be configured to send the encrypted content to the CAM in one of a plurality of formats, as indicated by the content_format field. However, in other exemplary embodiments the decoder may be configured to always send the encrypted data in a particular one of the formats. In this case, the content_format field may be omitted, as the CAM can be configured to always receive the encrypted data in that particular format.

TS_packet_pid is a 13-bit field that holds the value of the PID used by the decoder for the TS packets containing the ISOBMFF file, in the case that content_format equals 01 or 11. Pssh_count is an 8-bit field for storing the number of pssh boxes that were found in the moov box. This is zero if the content_format equals 10, as in this case the ISOBMFF file has not been parsed. Pssh_data( ) holds the content of the pssh boxes.

Referring now to FIG. 9, the syntax of an init_ack message sent from a CAM in response to the initialization message of FIG. 8 is illustrated. The init_ack message may be sent by the CAM once it has completed preparations to receive the encrypted data. As shown in FIG. 9, the payload of the init_ack( ) APDU comprises an 8-bit status field. If this is equal to 0, the message indicates that the CAM is ready to decrypt the ISOBMFF file data. If status is equal to 1, the message indicates that the CAM is not ready due to an unspecified error. If status is equal to 2, the message indicates that the requested content_format, as specified in the preceding initialization message, is not supported. The decoder may be configured to send a new initialization( ) APDU with a different content_format value, if the received init_ack( ) APDU has a status equal to 2.

In the present exemplary embodiment, once an init_ack( ) APDU with status equal to zero has been received from the CAM, the decoder is configured to assume that only null packets will be output by the CAM on the TS interface unless the decoder sends data to the CAM to be decrypted.

Referring now to FIG. 10, the syntax of a data request message sent from a CAM is illustrated according to an exemplary embodiment. The data_req( ) APDU may be used by the CAM to request specific data from the ISOBMFF file from the decoder. For example, the CAM may require specific data from the file in order to correctly decrypt the media samples. The data may be required in order to set up the DRM. In such cases, the CAM may request pieces of data from the ISOBMFF file so that it can check a user's rights to the content and set up the appropriate decryption units. The data_req( ) APDU can be sent at any time after the initialization( ) APDU, and may be sent before sending the init_ack( ) APDU to acknowledging the initialization( ) APDU.

As shown in FIG. 10, the payload of the data_req( ) APDU comprises a data_offset field and a data_length field. Data_offset is a 64-bit field whose value corresponds to the offset in bytes from the start of the ISOBMFF file, at which the required data can be found. Data_length is a 32-bit field for storing the length of the data being requested, expressed as a number of bytes. Upon receiving the data_req( ) APDU from the CAM, the decoder is configured to extract the requested data from the ISOBMFF file using the offset and length values provided. The decoder then returns the data to the CAM in the data_rsp( ) APDU shown in FIG. 11, unless the content is being sent as IP packets. In this case, the decoder is configured to send the requested data in IP packets as received from a server.

Although in the present exemplary embodiment the location of the requested data is denoted using offset and length values, in other exemplary embodiments other methods of identifying the data may be used.

Referring now to FIG. 11, the syntax of a data response message sent in response to the data request message of FIG. 10 is illustrated. As shown in FIG. 11, the payload of the data_rsp( ) APDU comprises a status field, data_length field and data field. Status is an 8-bit field used to denote whether the requested data was successfully retrieved. If status is equal to 0, this indicates that the requested data was found and the data is contained in the data_rsp message. If status is equal to 1, this indicates that the requested data was not found. If status is equal to 2, this indicates that the requested data was found, and will be sent in IP packets. 2 is only a valid value when the data was originally received from the decoder in IP packets.

Data_length is a 32-bit field for storing the number of bytes of data being returned. Data is an 8-bit field for storing one byte of the data that was requested by the CAM. The data_rsp( ) APDU may contain as many data fields as are required to send the complete portion of requested data.

Referring now to FIG. 12, the syntax of a pssh update request message sent from a CAM is illustrated according to an exemplary embodiment. The decoder can be configured to send a pssh_update_req( ) APDU to the decoder at any time. The pssh_update_req( ) APDU allows the CAM to update the pssh box in the ISOBMFF file when it is being stored locally in the decoder.

As shown in FIG. 12, the payload of the pssh_update_req( ) APDU comprises a pssh_data( ) field. The pssh_data( ) field can have any size, and contains the data to be written to the pssh box. In the present exemplary embodiment, if the decoder is playing the ISOBMFF file from local storage or recording the file to local storage, the decoder is configured to replace the pssh box with the same DRM universally unique identifier (UUID). Specifically, the decoder is configured to locate the pssh box in the version of the ISOBMFF file in local storage, matching the DRM UUID in the pssh box. The decoder then replaces the box in the stored file with the box provided in the pssh_update_req( ) APDU.

Referring now to FIG. 13, the syntax of a pssh update response message sent in response to the pssh update request message of FIG. 12 is illustrated. As shown in FIG. 13, the payload of the pssh_update_rsp( ) APDU comprises a status field of 8 bits. If status is equal to 0, this indicates that the pssh box was updated successfully. If status is equal to 1, this indicates that an unspecified error occurred.

The pssh_update_req( ) and pssh_update_rsp( ) APDUs effectively allow the CAM to write to the ISOBMFF file on the decoder, by controlling the decoder to update the pssh box with data supplied by the CAM. Although in the present exemplary embodiment the pssh box is updated, it is not limited to this case. In other exemplary embodiments, the CAM may use an update APDU similar to the pssh_update_req( ) APDU to control the decoder to write to other parts of the file. An example of a suitable generic write request command is shown in FIG. 14.

Referring now to FIG. 14, the syntax of a data write request message is illustrated according to an exemplary embodiment. The CAM is configured to send a write_req( ) APDU over the control interface to the decoder, when the CAM has data to be written to a file locally stored on the decoder, for example an ISOBMFF file. The file to be written to may be a file which is stored in a local non-volatile storage device, such as a hard disk, or may be a file which is being temporarily stored in memory. As shown in FIG. 14, the payload of the write_req( ) APDU comprises a 64-bit data_offset field, 32-bit data_length field, and an 8-bit data field. The data_offset and data_length fields are used to define the location of the data to be written within the file, in a similar manner to the data_offset and data_length fields of the data_req( ) APDU of FIG. 11. The CAM can use the write_req( ) APDU to write data of any length to the file in the decoder. Upon receiving the write_req( ) APDU from the CAM over the control interface, the decoder attempts to write the data included in the write_req( ) message to the file. The decoder may be configured to send a data write response message to the CAM over the control interface, to inform the CAM of whether the data was successfully written.

Referring now to FIG. 15, the syntax of a data write response message sent in response to the data write request message of FIG. 14 is illustrated. As shown in FIG. 15, the payload of the write_rsp( ) APDU comprises a status field of 8 bits. If status is equal to 0, this indicates that the data was successfully written to the file.

If status is equal to 1, this indicates that an unspecified error occurred.

Referring now to FIG. 16, the syntax of a track definition message is illustrated according to an exemplary embodiment. The decoder is configured to use this message to inform the CAM about a media track, for example a video or audio track. The message tells the CAM to expect to receive media data relating to this track over the TS interface. The message may include information about the track, for example a track identifier ID used to identify the track. The message may also include information from a sinf( ) box of the ISOBMFF file, for example DRM information relating to the track. The DRM information may be required by the CAM to set up the DRM system for that track.

Before the decoder sends any media data for a track to the CAM, it is configured to send a track_defn( ) APDU to the CAM to inform the CAM to expect data for this track. Tracks can be defined at any time during the playback of the content. A track number shall not be re-used during the playback of an MP4 file, i.e. the same track number is always used for the same track of data from the ISOBMFF file. In an aspect of another exemplary embodiment, where content is sent to the CAM over the TS interface in IP packets, these messages may be omitted.

As shown in FIG. 16, the payload of the track_defn( ) APDU comprises a track_ID field and a sinf_data( ) field. Track_ID is a 32-bit field for storing the value of the new track, i.e. the track ID, of the track that the decoder is about to send to the CAM over the TS interface. Sinf_data( ) can have any size, and is used to store the sinf box for the track. The sinf box is extracted from the moov box. Upon receiving a track_defn( ) APDU from the decoder, the CAM is configured to respond with the track_ack( ) APDU shown in FIG. 17.

Referring now to FIG. 17, the syntax of a track_ack message sent from a CAM in response to the track definition message of FIG. 16 is illustrated. As shown in FIG. 17, the payload of the track_ack( ) APDU comprises an 8-bit status field. If status is equal to 0, this indicates that the CAM is ready to accept media data associated with the track defined in the preceding track_defn( ) APDU. If status is equal to 1, this indicates that the CAM is not ready due to an unspecified error. In the present exemplary embodiment, the decoder is configured to not send any media data associated with the track until it has received the acknowledgement from the CAM that the CAM is ready to receive the data.

Referring now to FIG. 18, the syntax of a close message is illustrated according to an exemplary embodiment. The decoder uses this message to indicate to the CAM that the end of the file has been reached and that no more data will be sent over the TS interface. For example, the decoder may be configured to send the close( ) APDU to the CAM when the decoder has finished sending the media samples from the ISOBMFF file to the CAM. At this point the decoder may only be sending null TS packets or no TS packets at all, for instance because the end of the file has been reached, or because the user wishes to stop viewing it.

As shown in FIG. 18, the payload of the close( ) APDU comprises a 1-bit immediate field, and 7 reserved bits. If immediate is equal to 0, the CAM is configured to continue to process any media samples that may be held in its internal buffer and respond with a close_ack( ) APDU once all of the media data has been output over the TS interface to the decoder. If immediate is equal to 1, the CAM is configured to abort any decryption operations and flush any content data from its internal buffers. In this case, the CAM may not send any more TS packets or other packets to the device, except for null packets.

Once the CAM has flushed its internal buffers of any media samples or output the last packet containing any media samples, as appropriate, it is configured to respond to the decoder with a close_ack message. At this point, the CAM may be configured to revert to 'normal' operation, i.e. an operating mode in which encrypted data is received as a standard MPEG-2 TS.

Referring now to FIG. 19, the syntax of a close_ack message sent from a CAM in response to the close message of FIG. 16 is illustrated. As shown in FIG. 19, the payload of the close_ack( ) APDU comprises an 8-bit status field. If status is equal to 0, this indicates that the CAM has successfully completed the operation. If status is equal to 1, this indicates that an unspecified error has occurred. When the decoder receives the close_ack message from the CAM, it may be configured to start a new operation, such as sending an initialization( ) APDU for another ISOBMFF file, or routing a broadcast TS to the CAM.

An example operation sequence of a decoder and CAM will now be described, according to an exemplary embodiment. First, encrypted content is downloaded as an ISOBMFF file to a local storage device of the decoder. Next, a user inputs a command to being reproducing the encrypted content, i.e. to begin viewing the content. In response to the user command, the decoder opens a new SAS resource, and stops sending any TS packets to the CAM. In the present exemplary embodiment, the decoder then starts to parse the ISOBMFF file and extracts all of the pssh boxes. The decoder sends an initialization( ) APDU with the pssh data to the CAM, and with content_format set to 00. In response, the CAM examines the pssh boxes and matches the correct box to the DRM in the CAM. At this point, the CAM may be configured to use the DRM low speed communications (LSC) specified in CI Plus to obtain a license or check user rights. Also, the CAM may send a data_req( ) APDU to the decoder to request more data to check DRM and/or encryption metadata.

Once the CAM is ready to receive encrypted data from the decoder, the CAM sends an init_ack( ) APDU to the decoder and then sends a pssh_update_req( ) APDU with the new pssh box. The decoder receives the pssh_update_req( ) APDU and updates the pssh box in the downloaded file. This may require modification of the free box, if one is present. Subsequently, the decoder continues to parse the ISOBMFF file and discovers which tracks are encrypted. For each encrypted track, a track_defn( ) APDU is sent to the CAM with the sinf box for the track. For each received track_defn( ) APDU, the CAM sends a track_ack( ) APDU for each track. Then, the decoder begins extracting encrypted media samples from the ISOBMFF file and sends them to CAM in media sample packets. In this exemplary embodiment, the CAM uses encryption information in the media sample packets to decrypt the media samples, and returns decrypted media sample packets to the decoder.

Finally, the user finishes viewing the content, such that there are no more encrypted media samples to be sent to the CAM. At this point, the decoder sends the close( ) APDU to the CAM, which response with the close_ack( ) APDU.

Referring now to FIG. 20, a method of sending encrypted data to a CAM over a TS interface is illustrated, according to an exemplary embodiment. The method may be suitable for use in a decoder such as the decoder 120 of FIGS. 1A and 1B. First, in step S2001, the decoder forms a plurality of data packets including encrypted data to be sent to a CAM over a TS interface. For example, the encrypted data may be an ISOBMFF file, in which case the decoder may parse the file to extract data samples and encryption information, or alternatively may send the encrypted data without parsing the file. Each data packet includes a header and a portion of the encrypted data. For example, the data packet may be an encapsulated IP packet including the encrypted data as an IP packet, as shown in FIG. 2. Alternatively, the data packet may be a media sample packet as shown in FIG. 3, in which the payload holds the ms_data( ) file, or the data packet may be an MPEG-2 TS packet holding a portion of an ms_data( ) file, as shown in FIG. 4. Other arrangements may be possible. By packetizing the encrypted data into a plurality of data packets, encrypted data in formats other than an MPEG-2 TS format may be sent to the CAM over the TS interface.

Next, in step S2002, the plurality of data packets are sent to the CAM over the TS interface. The CAM decrypts the data and sends the decrypted data back to the decoder over the TS interface.

Referring now to FIG. 21, a method of forming a plurality of encapsulated IP packets is illustrated, according to an exemplary embodiment. This method can be used with the data structure shown in FIG. 2. First, in step S2101, encrypted data is received from a content provider as a plurality of IP packets. In the present exemplary embodiment the encrypted data is held in an ISOBMFF file. Then, in step S2102, the decoder adds a header to each IP packet to form an encapsulated IP packet. Each encapsulated IP packet may also include a sync byte preceding the header, as shown in FIG. 2. Then, in step S2103, the plurality of encapsulated IP packets are sent to the CAM over the TS interface. The CAM can receive the encapsulated IP packets, extract the IP packets, and reconstruct the original ISOBMFF file to decrypt the encrypted data of the ISOBMFF file.

Figure 22:
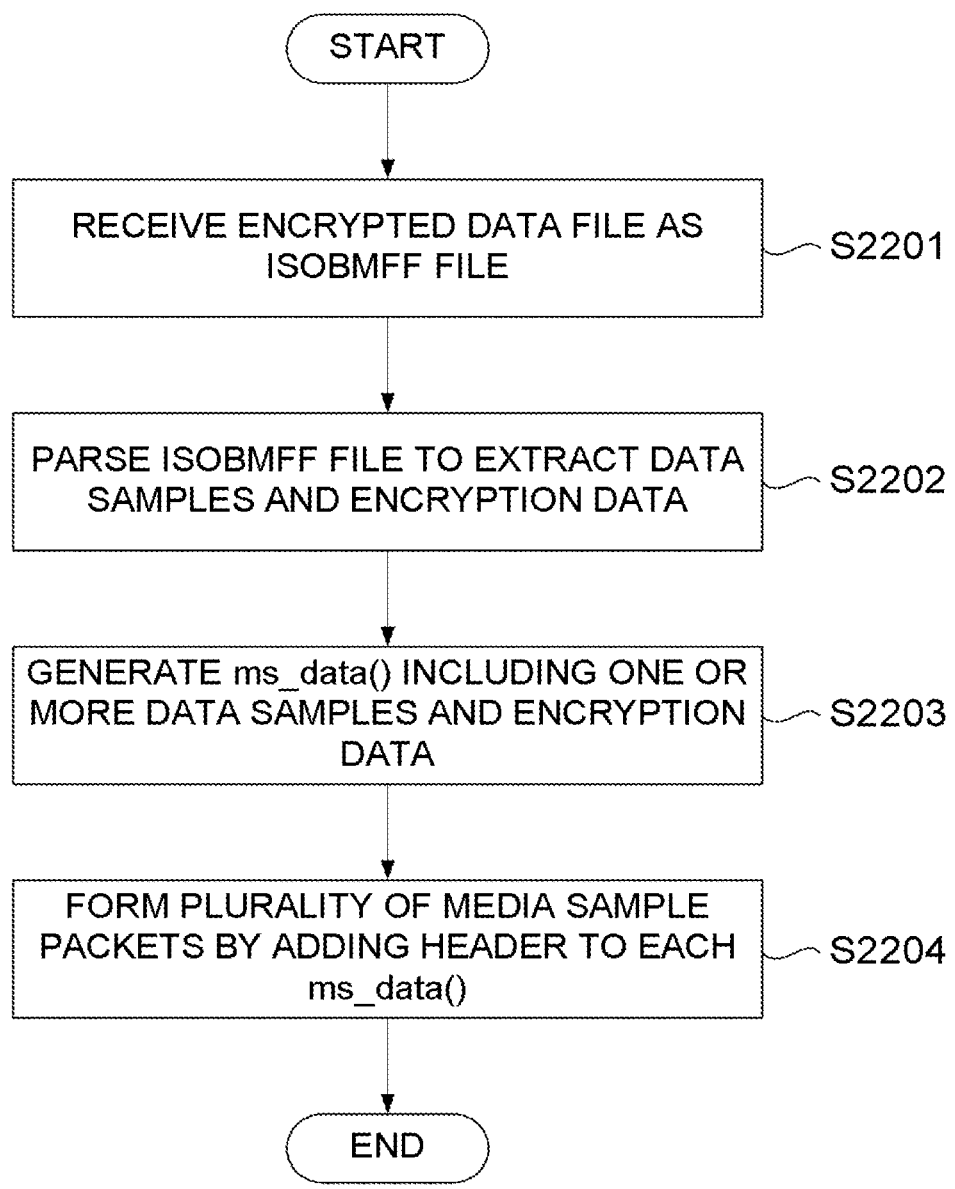
FIG. 22 illustrates a method of forming a plurality of media sample packets to hold data samples and encryption metadata extracted from an ISOBMFF file, according to an aspect of an exemplary embodiment.

Referring now to FIG. 22, a method of forming a plurality of media sample packets to hold data samples and encryption metadata extracted from an ISOBMFF file is illustrated, according to an exemplary embodiment. This method can be used with the data structure shown in FIG. 3. First, in step S2201, a decoder receives an ISOBMFF file including encrypted multimedia data from a content provider. In the present exemplary embodiment the encrypted data is stored as an ISOBMFF file, but in other exemplary embodiments other formats may be used. Then, in step S2202, the decoder parses the ISOBMFF file to extract a plurality of data samples and encryption metadata associated with each data sample. Next, in step S2203, the decoder generates one or more ms_data( ) structures to store the data samples and associated metadata. Each ms_data( ) may hold one or more data samples. Then, in step S2204, the decoder adds a header and sync byte to each ms_data( ) to form a plurality of media sample packets with the structure shown in FIG. 3. The decoder then sends the media sample packets to the CAM over the TS interface, which decrypts the encrypted data samples in each ms_data( ) using the associated encryption metadata, and returns the decrypted data to the decoder.

Figure 23:
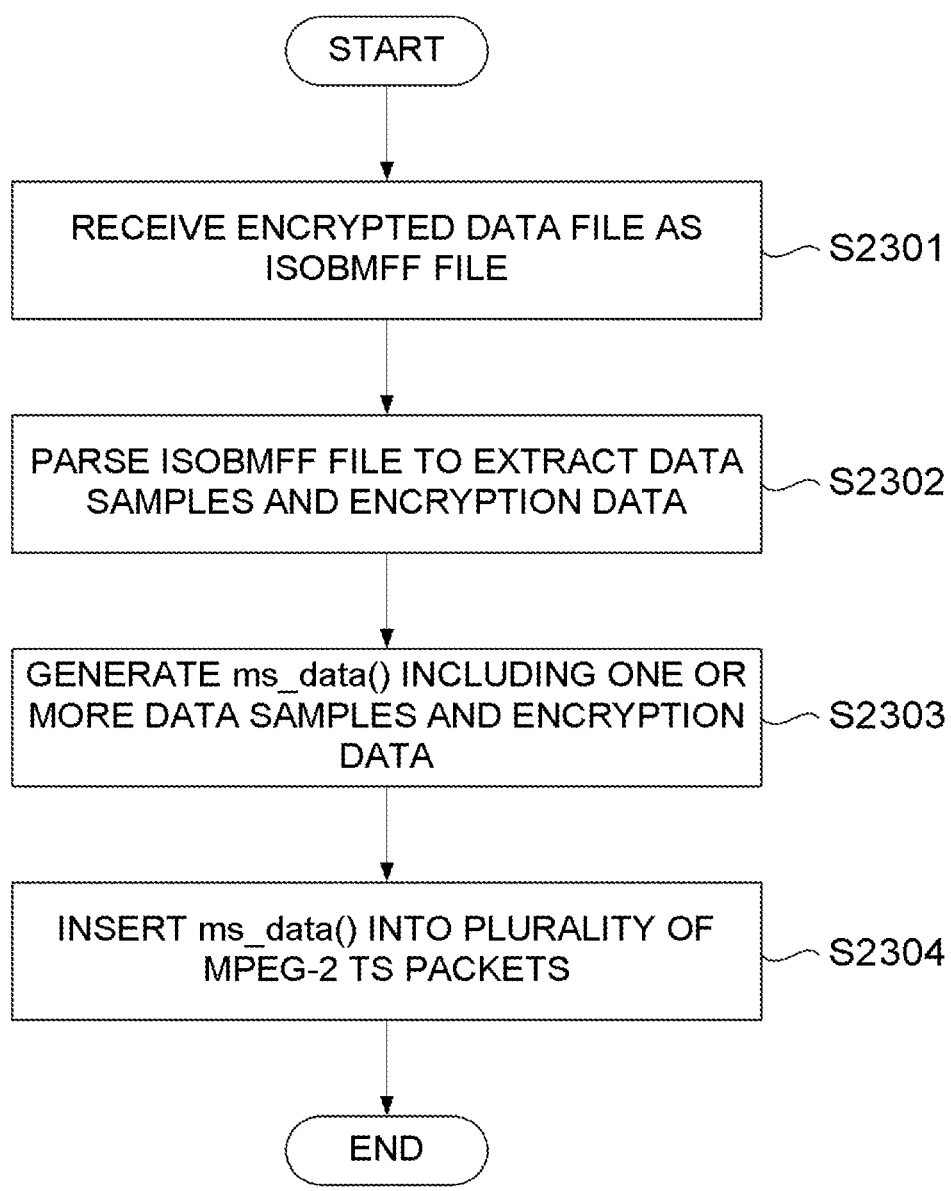
FIG. 23 illustrates a method of forming a plurality of MPEG-2 TS packets to hold data samples and encryption metadata extracted from an ISOBMFF file, according to an aspect of another exemplary embodiment.

Referring now to FIG. 23, a method of forming a plurality of MPEG-2 TS packets to hold data samples and encryption metadata extracted from an ISOBMFF file is illustrated, according to an exemplary embodiment. This method can be used with the data structure shown in FIG. 4. First, in step S2301, a decoder receives an ISOBMFF file including encrypted multimedia data from a content provider. In the present exemplary embodiment the encrypted data is stored as an ISOBMFF file, but in other exemplary embodiments other formats may be used. Then, in step S2302, the decoder parses the ISOBMFF file to extract a plurality of data samples and encryption metadata associated with each data sample. Next, in step S2303, the decoder generates one or more ms_data( ) structures to store the data samples and associated metadata. Each ms_data( ) may hold one or more data samples. Then, in step S2304, the decoder inserts each ms_data( ) into a plurality of MPEG-2 TS packets, and sends the MPEG-2 TS packets to the CAM over the TS interface. The CAM receives the TS packets, reconstructs the ms_data( ), decrypts the encrypted data samples in each ms_data( ) using the associated encryption metadata, and returns the decrypted data to the decoder.

Although exemplary embodiments have been described with reference to a decoder for receiving and decoding multimedia data, in other exemplary embodiments the functionality of the common interface may be provided in a device other than a decoder. For example, a device may be configured to receive encrypted multimedia data from a content provider, or from a local storage device, and send the encrypted data from a CAM over a CI. Instead of decoding the decrypted data itself, the device may be configured to receive the decrypted data from the CAM and forward the decrypted data to a separate decoder.

Also, various APDU structures have been described for use in exemplary embodiments, but the inventive concept is not limited to use with these control message structures. In other exemplary embodiments, certain fields may be omitted, and/or other fields may be added to particular messages as required. For example, in relation to the initialization( ) APDU, the content_format field may be omitted if the decoder is configured to always send data in a particular format over the TS interface. Similarly, in relation to the data packet structures of FIGS. 2, 3 and 4, the inventive concept is not limited to use with these structures. For example, in the ms_data( ) structure, other fields may be included as well as, or instead of, the encryption information and sample_data fields. In the example described, the ms_data( ) structure is used to send media data samples from the mdat box of the ISOBMFF file, but the ms_data( ) structure may also be used to send other data from the ISOBMFF file.

In exemplary embodiments in which content is downloaded to local storage, the downloaded content may be played by a native application or by an interactive application, for example an Hybrid Broadcast Broadband Television (HbbTV) or Multimedia Home Platform (MHP) application. In exemplary embodiments in which content is provided by progressive download, adaptive streaming or content streaming methods, the content may be played under the control of an interactive application. In any exemplary embodiment the user may request trick play of the content, for example by selecting to fast forward or rewind. The controlling application does not need to know whether the DRM is implemented as an embedded feature in the decoder or in an external CAM.

When the controlling application requests the native player to start playback of the content, the native player will request the data from a content source such as a remote streaming server. It will also initialize the connection with the CAM. For exemplary embodiments in which the multimedia content is received as a plurality of IP packets, the IP packets from the remote server are routed through the CAM before being processed by the IP stack in the decoder. The decoder can then parse the unencrypted ISOBMFF file and decode it. For exemplary embodiments in which the decoder parses the ISOBMFF file, once the native player has parsed enough of the ISOBMFF file to be able to extract the track information, it will notify the CAM of the tracks that need to be decrypted and start streaming the content over the TS interface.

Also, although exemplary embodiments of the inventive concept have been described in relation to an ISOBMFF file, the inventive concept is not limited to use with the ISOBMFF format. Other exemplary embodiments may be used with different standards, such as a digital video broadcasting (DVB) standard, Open IPTV Forum (OIPF) standard, or Digital Entertainment Content Ecosystem (DECE) standard.

While exemplary embodiments of the inventive concept have been described above, the skilled person will understand that many variations and modifications may be possible without departing from the scope of the inventive concept as defined in the accompanying claims.

What is claimed is:

1. An apparatus for sending encrypted data to a conditional access module (CAM) over a common interface (CI), the apparatus comprising:
    a data packet generator configured to form a plurality of data packets, one data packet of the plurality of data packets comprising a header and a payload for storing the encrypted data; and
    a transport stream (TS) interface module configured to send the plurality of data packets to the CAM over a TS interface of the CI,
    wherein the apparatus is configured to send an initialization message to the CAM over a control interface of the CI, to notify the CAM that the encrypted data will be sent over the TS interface to the CAM, and
    wherein a decrypted data, which is decrypted from the encrypted data based on the initialization message, is received via the TS interface.

2. The apparatus of claim 1, wherein the encrypted data is received from a content provider as a plurality of internet protocol (IP) packets, and
    wherein the data packet generator is further configured to form the one data packet by attaching the header to one of the plurality of IP packets to form an encapsulated IP packet.

3. The apparatus of claim 2, wherein the encapsulated IP packet is of encapsulated data packets, and the TS interface module is configured to send the encapsulated IP packets over the TS interface using multiprotocol encapsulation (MPE) according to European Telecommunications Standards Institute ETSI EN 301 192 Standard.

4. The apparatus of claim 1, wherein the data packet generator is further configured to parse a file containing the encrypted data to extract data samples and encryption information relating to the data samples, and
    wherein the data packet generator is further configured to generate a plurality of data sample files, one of the plurality of data sample files including one or more of the data samples and the encryption information relating to the one or more data samples.

5. The apparatus of claim 4, wherein for the one data packet, the data packet generator is further configured to include one of the plurality of data sample files in the payload of the one data packet.

6. The apparatus of claim 4, wherein the data packet generator is further configured to divide the one of the plurality of data sample files into a plurality of data sample file portions, and
    wherein the plurality of data packets are Moving Picture Experts Group MPEG-2 TS packets, wherein one MPEG-2 TS packet of the plurality of MPEG-2 TS packets includes one of the data sample file portions.

7. The apparatus of claim 6, wherein the header of the one MPEG-2 TS packet includes information about whether the data sample file portion included in the one MPEG-2 TS packet corresponds to a start of the data sample file.

8. The apparatus of claim 1, wherein the apparatus is configured to receive the encrypted data by:
    downloading the encrypted data to a storage device; or
    receiving the encrypted data as a progressive download from a server; or
    receiving the encrypted data as a plurality of files using adaptive streaming; or
    receiving the encrypted data as a continuous stream using content streaming.

9. The apparatus of claim 1, further comprising:
    a storage device,
    wherein the encrypted data is stored in the storage device.

10. The apparatus of claim 1, wherein the encrypted data is in an International Organization for Standardization base media file format (ISOBMFF) file.

11. The apparatus of claim 1, wherein the apparatus is configured to receive decrypted data from the CAM over the TS interface, and decode the decrypted data.

12. The apparatus of claim 1, wherein the data packet generator is configured to form the plurality of data packets according to a selected one of a plurality of formats, and
    wherein the apparatus is configured to include information about the selected format in the initialization message sent to the CAM.

13. The apparatus of claim 1, wherein the apparatus is configured to include packet identifier (PID) information in the initialization message sent to the CAM.

14. The apparatus of claim 1, wherein the apparatus is configured to send a close message to the CAM over the control interface once all of the encrypted data has been sent.

15. The apparatus of claim 1, wherein the apparatus is configured to receive a data request message from the CAM over the control interface, retrieve requested data specified in the data request message, and send the requested data to the CAM.

16. The apparatus of claim 1, wherein the apparatus is configured to receive a data write request message from the CAM over the control interface, the data write request message including data to be written and data location information, and wherein the apparatus is configured to write the data included in the data write request message to a file, according to the data location information.

17. The apparatus of claim 1, wherein the apparatus is configured to send a track definition message to the CAM over the control interface, the track definition message including information about a track and digital rights management (DRM) information relating to the track.

18. A conditional access module (CAM) for receiving encrypted data over a common interface (CI), the CAM comprising:

a processor comprising:
a control module configured to receive an initialization message over a control interface of the CI, the initialization message including format information about a format in which the encrypted data will be received by the CAM over a transport stream (TS) interface of the CI;
a conditional access (CA) decryption module configured to receive the encrypted data over the TS interface, and decrypt the encrypted data based on the format information of the initialization message; and
a data transmitter configured to send the decrypted data over the TS interface to a source from which the encrypted data was received.

19. The CAM of claim 18, wherein if the decryption module requires additional data to decrypt the encrypted data, the control module is further configured to send a data request message over the control interface to request the additional data.

20. The CAM of claim 18, wherein the CAM is further configured to send a data write request message over the control interface to request data to be written to a file, the data write request message including data to be written to the file and data location information, the data location information relating to a location in the file at which the data is to be written.

21. The CAM of claim 18, wherein the CAM is further configured to receive a track definition message over the control interface, the track definition message including information about a track and digital rights management (DRM) information relating to the track, and wherein the CAM is configured to set up a DRM system for the track based on the DRM information included in the track definition message.

22. The CAM of claim 18, wherein the CAM is further configured according to the CI Plus Specification, and wherein the data transmitter comprises a content control CC encryption module configured to send the decrypted data using local encryption.

23. A system for decrypting encrypted data, the system comprising:

a processor and a memory comprising:
a data packet generator configured to form a plurality of data packets, one data packet of the plurality of data packets comprising a header and a payload for storing the encrypted data; and
a transport stream (TS) interface module configured to send the plurality of data packets to a conditional access module (CAM) over a TS interface of a common interface (CI), wherein the CAM comprises:
a control module configured to receive an initialization message over a control interface of the CI, the initialization message including format information about a format in which the encrypted data will be received by the CAM over the TS interface of the CI;
a conditional access (CA) decryption module configured to receive the encrypted data over the TS interface, and decrypt the encrypted data based on the format information of the initialization message; and
a data transmission module configured to send the decrypted data over the TS interface to a source from which the encrypted data was received.

24. A method of sending encrypted data to a conditional access module (CAM) over a common interface (CI), the method comprising:

forming a plurality of data packets, one data packet of the plurality of data packets comprising a header and a payload for storing the encrypted data;
sending the plurality of data packets to the CAM over a transport stream (TS) interface of the CI;
sending an initialization message to the CAM over a control interface of the CI, to notify the CAM that the encrypted data will be sent over the TS interface to the CAM; and
receiving a decrypted data, which is decrypted from the encrypted data based on the initialization message, via the TS interface.

25. The method of claim 24, further comprising:
receiving the encrypted data from a content provider as a plurality of internet protocol IP packets,
wherein the one data packet is formed by attaching the header to one of the plurality of IP packets to form an encapsulated IP packet.

26. The method of claim 25, wherein sending the plurality of data packets comprises sending the encapsulated IP packet over the TS interface using multiprotocol encapsulation (MPE) according to European Telecommunications Standards Institute ETSI EN 301 192 Standard.

27. The method of claim 24, further comprising:
parsing a file containing the encrypted data to extract data samples and encryption information relating to the data samples; and
generating a plurality of data sample files, wherein one data sample file of the plurality of data sample files includes one or more of the data samples and the encryption information relating to the one or more data samples.

28. The method of claim 27, wherein forming the plurality of data packets further comprises including the one data sample file in the payload of the one data packet.

29. The method of claim 27, further comprising:
dividing the one data sample file into a plurality of data sample file portions,
wherein the plurality of data packets are Moving Picture Experts Group MPEG-2 TS packets, wherein one of the plurality of MPEG-2 TS packets includes one of the data sample file portions.

30. The method of claim 24, wherein the encrypted data is in an International Organization for Standardization base media file format (ISOBMFF) file.

31. The method of claim 24, further comprising:
selecting one of a plurality of formats for sending the encrypted data to the CAM; and
including information about the selected one of the plurality of formats in the initialization message sent to the CAM.

32. The method of claim 24, further comprising:
sending a close message to the CAM over the control interface once all of the encrypted data has been sent.

33. The method of claim 24, further comprising:
receiving a data request message from the CAM over the control interface;
retrieving requested data specified in the data request message; and
sending the requested data to the CAM.

34. The method of claim 24, further comprising:
receiving a data write request message from the CAM over the control interface, the data write request message including data to be written and data location information; and
writing the data included in the data write request message to a file, according to the data location information.

35. The method of claim 24, further comprising:
sending a track definition message to the CAM over the control interface, the track definition message including information about a track and digital rights management (DRM) information relating to the track.

36. A non-transitory computer readable storage medium storing a computer program which, when executed on a processor, causes the processor to perform the method of claim 24.

37. A conditional access module (CAM) for receiving encrypted data over a common interface (CI), the CAM comprising:
a processor comprising:
a control module configured to receive an initialization message over a control interface of the CI, the initialization message including format information about a format of the encrypted data to be sent to the CAM; and
a conditional access (CA) decryption module configured to receive the encrypted data over the transport stream (TS) interface, and decrypt the encrypted data based on the format information.

* * * * *